US008233893B2

(12) United States Patent
Chen

(10) Patent No.: US 8,233,893 B2
(45) Date of Patent: Jul. 31, 2012

(54) MOBILE HANDSET UPDATE PACKAGE GENERATOR THAT EMPLOYS NODES TECHNIQUE

(75) Inventor: Shao-Chun Chen, Aliso Viejo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1353 days.

(21) Appl. No.: 10/646,230

(22) Filed: Aug. 22, 2003

(65) Prior Publication Data

US 2006/0258344 A1  Nov. 16, 2006

Related U.S. Application Data

(60) Provisional application No. 60/405,253, filed on Aug. 22, 2002, provisional application No. 60/415,620, filed on Oct. 2, 2002, provisional application No. 60/441,867, filed on Jan. 22, 2003, provisional application No. 60/447,977, filed on Feb. 18, 2003.

(51) Int. Cl.
*H04M 3/00* (2006.01)

(52) U.S. Cl. ........ 455/419; 455/403; 717/168; 717/100; 717/106; 717/170

(58) Field of Classification Search .................. 455/419; 717/168, 106, 170, 100
See application file for complete search history.

(56) References Cited

U.S. PATENT DOCUMENTS

| 5,261,055 | A |   | 11/1993 | Moran et al. ............... 395/275 |
|---|---|---|---|---|
| 5,442,771 | A |   | 8/1995 | Filepp et al. ............... 395/650 |
| 5,479,637 | A |   | 12/1995 | Lisimaque et al. ........... 395/430 |
| 5,579,522 | A | * | 11/1996 | Christeson et al. ............... 713/2 |
| 5,596,738 | A |   | 1/1997 | Pope ............................ 395/430 |
| 5,598,534 | A |   | 1/1997 | Haas ........................ 395/200.09 |
| 5,608,910 | A |   | 3/1997 | Shimakura ..................... 395/670 |
| 5,623,604 | A |   | 4/1997 | Russell et al. ............. 395/200.1 |
| 5,649,112 | A | * | 7/1997 | Yeager et al. ................. 709/220 |
| 5,666,293 | A | * | 9/1997 | Metz et al. .................... 709/220 |
| 5,752,039 | A |   | 5/1998 | Tanimura ...................... 395/712 |
| 5,778,440 | A |   | 7/1998 | Yiu et al. ....................... 711/154 |
| 5,790,974 | A |   | 8/1998 | Tognazzini ................... 701/204 |
| 5,832,520 | A | * | 11/1998 | Miller ........................... 707/203 |
| 5,878,256 | A |   | 3/1999 | Bealkowski et al. ......... 395/652 |
| 5,960,445 | A |   | 9/1999 | Tamori et al. ................. 707/203 |
| 5,974,250 | A | * | 10/1999 | Angelo et al. ................ 713/100 |

(Continued)

FOREIGN PATENT DOCUMENTS

CA  2339923  3/2000

(Continued)

OTHER PUBLICATIONS

"Focus on OpenView a guide to Hewlett-Packard's Network and Systems Management Platform", Nathan J. Muller, pp. 1-291, CBM Books, published 1995.

(Continued)

*Primary Examiner* — Lester Kincaid
*Assistant Examiner* — Diego Herrera

(57) ABSTRACT

A mobile handset in a mobile services network, with access to a plurality of services including a firmware/software update service, is also capable of updating its update agent using an appropriate update package that is retrieved from an update package repository via a management server. A generator with nodes preprocessor is used to create an update package and associated information, such as nodes information and filter information, by comparing two different versions of the firmware/software of the mobile handset.

22 Claims, 4 Drawing Sheets

U.S. PATENT DOCUMENTS

| | | | | |
|---|---|---|---|---|
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,546,552 | B1* | 4/2003 | Peleg | 717/170 |
| 6,659,345 | B2* | 12/2003 | Sukeda et al. | 235/382 |
| 6,832,373 | B2* | 12/2004 | O'Neill | 717/171 |
| 6,925,467 | B2* | 8/2005 | Gu et al. | 707/687 |
| 7,073,017 | B2* | 7/2006 | Yamamoto | 711/103 |
| 7,143,115 | B2* | 11/2006 | Jones et al. | 707/200 |
| 7,242,929 | B2* | 7/2007 | Draluk et al. | 455/419 |
| 7,275,243 | B2* | 9/2007 | Gibbons et al. | 717/159 |
| 7,292,846 | B2* | 11/2007 | Mittal | 455/418 |
| 7,313,791 | B1* | 12/2007 | Chen et al. | 717/170 |
| 7,369,851 | B2* | 5/2008 | Okonnen et al. | 455/435.1 |
| 7,433,936 | B2* | 10/2008 | Zhu et al. | 709/220 |
| 7,555,750 | B1* | 6/2009 | Lilley | 717/168 |
| 7,818,556 | B2* | 10/2010 | Iima et al. | 713/1 |
| 2001/0029178 | A1* | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1* | 2/2003 | Rajaram et al. | 717/173 |
| 2003/0037075 | A1 | 2/2003 | Hannigan et al. | 707/500 |
| 2003/0055919 | A1* | 3/2003 | Fong et al. | 709/220 |
| 2003/0061384 | A1 | 3/2003 | Nakatani | 709/245 |
| 2003/0081786 | A1* | 5/2003 | Nakano et al. | 380/277 |
| 2003/0103484 | A1* | 6/2003 | Oommen et al. | 370/338 |
| 2003/0154471 | A1* | 8/2003 | Teachman et al. | 717/171 |
| 2004/0017831 | A1* | 1/2004 | Shen et al. | 370/486 |
| 2004/0034853 | A1* | 2/2004 | Gibbons et al. | 717/174 |
| 2004/0068724 | A1* | 4/2004 | Gardner et al. | 717/173 |
| 2004/0095457 | A1* | 5/2004 | Pokorny et al. | 347/171 |
| 2004/0166839 | A1* | 8/2004 | Okkonen et al. | 455/419 |
| 2004/0243992 | A1* | 12/2004 | Gustafson et al. | 717/168 |
| 2004/0243993 | A1* | 12/2004 | Okonnen et al. | 717/168 |
| 2005/0005268 | A1* | 1/2005 | Zilavy et al. | 717/170 |
| 2005/0039178 | A1* | 2/2005 | Marolia et al. | 717/168 |
| 2005/0071385 | A1* | 3/2005 | Rao | 707/200 |
| 2005/0096025 | A1* | 5/2005 | Qumei et al. | 455/418 |
| 2005/0102615 | A1* | 5/2005 | Roman et al. | 715/513 |
| 2005/0114504 | A1* | 5/2005 | Marolia et al. | 709/224 |
| 2005/0204068 | A1* | 9/2005 | Zhu et al. | 709/252 |
| 2005/0227683 | A1* | 10/2005 | Draluk et al. | 455/419 |
| 2006/0039561 | A1* | 2/2006 | Ypya et al. | 380/270 |
| 2006/0174242 | A1* | 8/2006 | Zhu et al. | 717/172 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MOBILE HANDSET UPDATE PACKAGE GENERATOR THAT EMPLOYS NODES TECHNIQUE

CROSS-REFERENCE TO RELATED APPLICATIONS/INCORPORATION BY REFERENCE

This patent application makes reference to, claims priority to and claims benefit from U.S. Provisional Patent Application Ser. No. 60/405,253, entitled "Firmware Update Network And Process Employing Preprocessing Techniques," filed on Aug. 22, 2002, U.S. Provisional Patent Application Ser. No. 60/415,620, entitled "System for Generating Efficient And Compact Update Packages," filed on Oct. 2, 2002, and U.S. Provisional Patent Application Ser. No. 60/441,867, entitled "Mobile Handset Update Package Generator That Employs Nodes Technique," filed on Jan. 22, 2003. This patent application also makes reference to U.S. Provisional Patent Application Ser. No. 60/447,977, entitled "Update Package Generator Employing Partial Predictive Mapping Techniques For Generating Update Packages For Mobile Handsets," filed on Feb. 18, 2003.

The complete subject matter of each of the above-referenced United States Patent Applications is hereby incorporated herein by reference, in its entirety. In addition, this application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

This application is also related to the following co-pending applications, the complete subject matter of each of which is hereby incorporated herein by reference in its entirety:

| Ser. No. | Docket No. | Title | Filed | Inventors |
|---|---|---|---|---|
| | 14121US02 | Firmware Update Network and Process Employing Preprocessing Techniques | Aug. 21, 2003 | Chen Gustafson |
| | 14122US02 | System for Generating Efficient and Compact Update Packages | Aug. 21, 2003 | Chen Gustafson Barber |
| | 14911US02 | Update Package Generator Employing Partial Predictive Mapping for Generating Update Packages for Mobile Handsets | Aug. 21, 2003 | Lilley |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

The present invention relates generally to update of firmware/software components in mobile handsets using an update agent, and, more specifically, to the generation of compact update packages employing optimization techniques.

2. Background of the Art

Electronic devices, such as mobile phones and personal digital assistants (PDAs), often contain firmware and application software that are either provided by the manufacturer of the electronic devices, by telecommunication carriers, or by third parties. These firmware and application software often contain software bugs. New versions of the firmware/software are periodically released to fix the bugs or to introduce new features, or both.

When informing a mobile handset of the need to update its firmware/software, problems might arise. Problems may also arise when attempting to control the size of an update package containing the difference information. Update package generation is prone to an "avalanche" effect, wherein a minor change to code may result in relocation of a large amount of other code or components. The relocation of the code may result in difference information that is very large, thereby prolonging the download process and making it more costly. Other problems may arise, such as being able to clearly and efficiently specifying the steps needed to update firmware/software in the handset to a new version.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a mobile services network comprising a mobile electronic device having a non-volatile memory, a random access memory and security services; the network further comprising a management server; an update package repository; and a generator with nodes preprocessor for generating update packages for updating an old version of a firmware to a new version of the firmware. The update packages generated by the generator with nodes preprocessor may incorporate nodes and filter information.

The process of generating an update package with the generator with nodes preprocessor comprises converting the symbols in the new and old images of the firmware into distance information; determining a list of nodes in the old and new images of the firmware; generating filter information; generating the update package; and outputting the update package.

The nodes for the node list are determined by determining the addresses of the symbols in the old image and in the new image; comparing the differences in the addresses and predicting differences in addresses of subsequent symbols; determining the symbols for which offsets cannot be predicted; and using the symbols that could not be predicted as additional node symbols.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
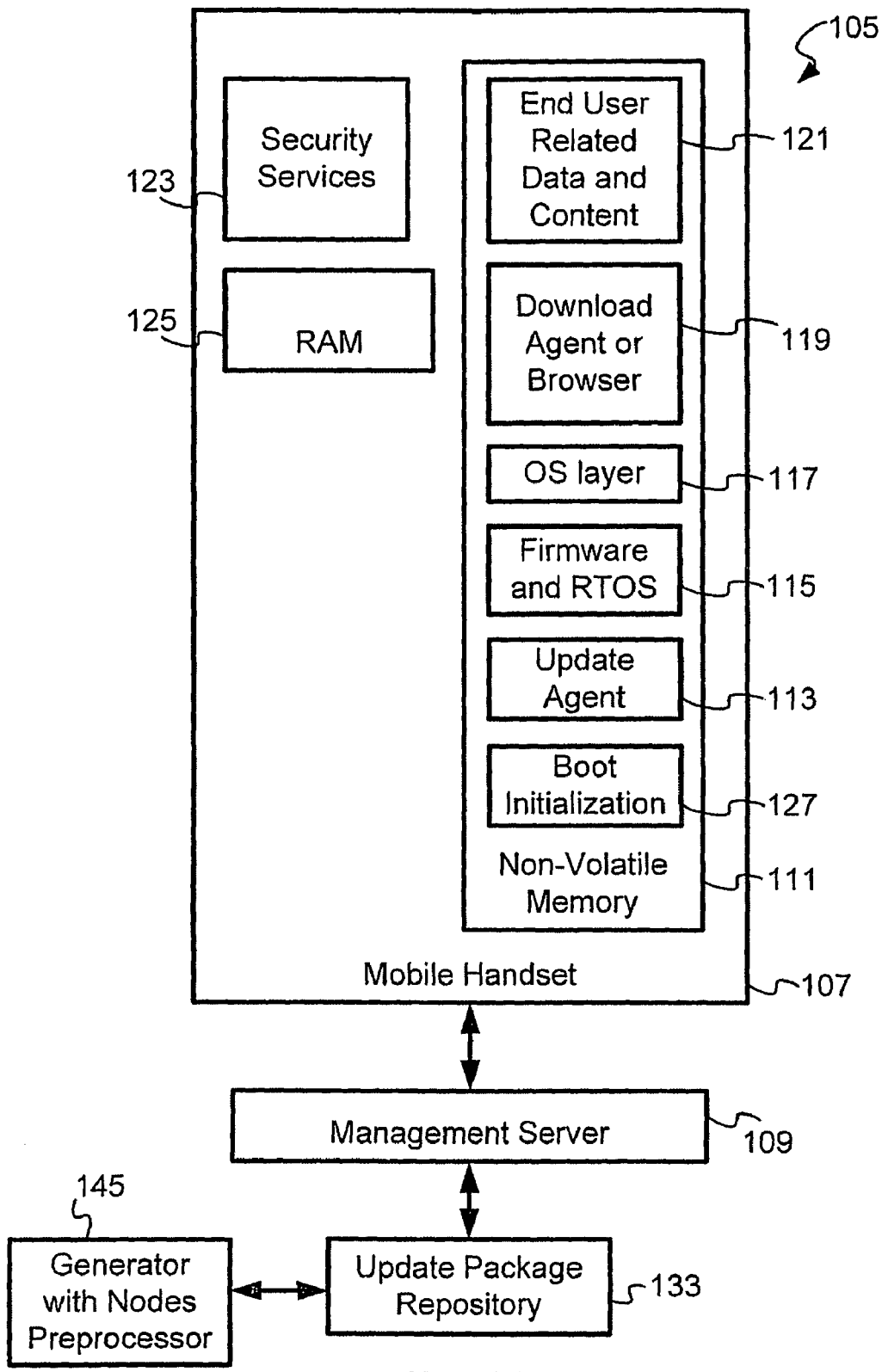
FIG. 1A illustrates a block diagram of an exemplary mobile services network, in accordance with an embodiment of the present invention.

FIG. 1A illustrates a block diagram of an exemplary mobile services network 105, in accordance with an embodiment of the present invention. In the exemplary embodiment of FIG. 1, the mobile services network 105 comprises a mobile handset 107, a management server 109, an update package repository 133, and a generator with nodes preprocessor 145. The mobile handset 107 may have access to services that may include a firmware/software update service. The mobile handset 107 may retrieve update packages with associated nodes and filter information from the management server 109. The update packages may be generated by the generator with nodes preprocessor 145 and populated into the update package repository 133, which is linked to the management server 109. The update package, generated by the generator with nodes preprocessor 145, may incorporate nodes information and filter information within the same package. In another embodiment of the present invention, the mobile handset 107 may be a personal digital assistant (PDA) or a similar device.

In one embodiment, the generator with nodes preprocessor 145 may be coupled to the update package repository 133. The management server 109 may access the update package repository 133 to retrieve the update packages and associated information, such as the metadata, nodes information, filter information, etc.

In another embodiment, the generator with nodes preprocessor 145 may be located at a remote location. In such embodiment, the output of the generator with nodes preprocessor 145, namely update packages and associated information, may be communicated to the update package repository 133 through a storage medium, such as a CD-ROM disk, and loaded into the update package repository 133.

The generator with nodes preprocessor 145 may generate an update package and associated information, by comparing two different versions of the firmware/software of the mobile handset 107.

The mobile handset 107 may comprise a non-volatile memory 111, a random access memory (RAM) 125, and security services 123. The non-volatile memory 111 of the mobile handset 107 may comprise an update agent 113, a firmware and real-time operating system (RTOS) 115, an operating system (OS) layer 117, a download agent or browser 119, an end-user-related data and content 121, and boot initialization 127.

In one embodiment, the mobile handset 107 downloads an update package from the update package repository 133, and then reboots. Upon rebooting the mobile handset 107 starts up, executes the boot initialization 127, and determines whether the update agent 113 needs to execute the update process. The decision to execute the update process by the update agent 113 may be based on status information such as, for example, the availability of an update package. The status information may be available in the non-volatile memory 111. If it is determined that the update agent 113 needs to execute the update process, the mobile handset 107 may invoke the update agent 113.

In one embodiment, the generator with nodes preprocessor 145 may generate a list of nodes when it generates an update package. Each node in the list of nodes may comprise two integers, for example, one integer indicating the address of the node, and another integer indicating the movement or the offset of the node. The node list may be incorporated within an update package and loaded into the update package repository 133. When the mobile handset 107 requests an update package from the management server 109, the update package may be delivered to the mobile handset 107 from the update package repository 133 via the management server 109. The update agent 113 in the mobile handset 107 may execute a "preprocessing" step using the nodes list, to prepare the existing or old image of the firmware/software for update. After the preprocessing, the update agent 113 may employ other information from the update package to update the firmware/software.

The nodes technique for preprocessing binary images of firmware/software, may utilize "logical" alignment of elements within different versions of code such as, for example, an old version and a new version of firmware. The output of the nodes preprocessor component of the generator with nodes preprocessor 145 may include a node list and a filter list. The node list and the filter list may be incorporated into the update package to be sent as a single package to the mobile handset 107.

Figure 1B:
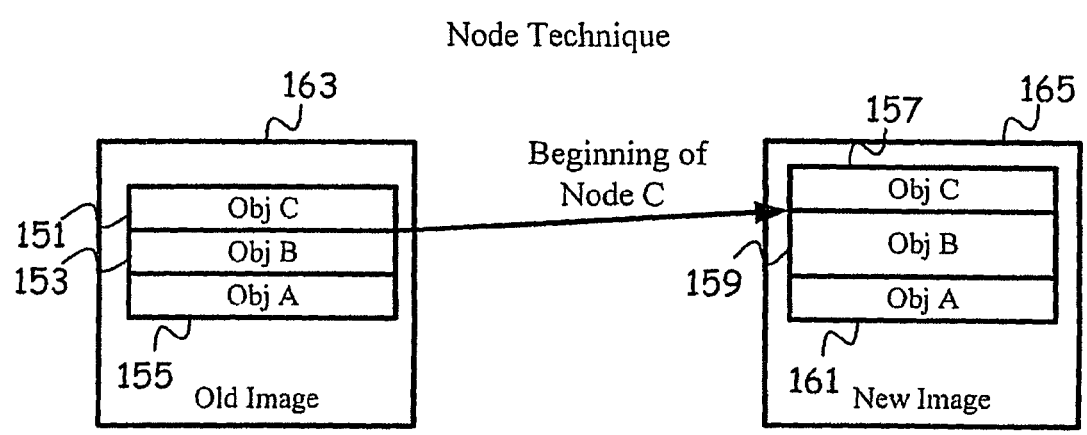
FIG. 1B illustrates a block diagram of exemplary changes to a binary memory image between two versions of firmware/software of a mobile handset, in accordance with an embodiment of the present invention.

FIG. 1B illustrates a block diagram of exemplary changes to a binary memory image between two versions of firmware/software of a mobile handset 107, in accordance with an embodiment of the present invention. In this example, components in an old binary memory image 163 are modified and their size has changed. The old binary image 163 and the corresponding new binary image 165 have corresponding components, Obj A, 155 and 161, Obj. B, 153 and 159, and Obj. C, 151 and 157.

In the example of FIG. 1B, an old binary image 163 is modified to a new binary image 165. The difference between the old binary image 163 and the new binary image 165 is a change in the size of a component, Obj. B, 153 and 159. Such change in size of one component results in a change of the starting address of another component, Obj. C, 151 and 157.

In one embodiment, the node technique may include determining changes of locations of various symbols in the old binary image 163, determining "node" symbols, and predicting the location of some symbols based on relocation information gathered from the "node" symbols. In one embodiment, the nodes may be determined by comparing each symbol from the old and new binary images to determine locations of code segments in the new binary image. In a related embodiment, symbols may be identified, given that locations of such symbols may be predicted as offsets from "node" symbols. Wherein, "node" symbols appear as relocated symbols for which location may not be easily predicted, such as the symbol for the beginning of a function that may have been relocated. Determining "node" symbols may be achieved by scanning through the symbols of the old binary image 163, locating the corresponding symbols in the new binary image 165, comparing the differences in the addresses of the symbols, predicting the differences in addresses for subsequent symbols, identifying symbols with offsets that were not predicted, and using those identified symbols as "node" symbols. Determining "node" symbols may also include determining the range of addresses where offset prediction or address differences work, and capturing and storing such information as filter information. Filter information, for example, may consist of entries wherein each entry may be a 2-tuple comprising a location and a range value as shown hereinafter in an example.

The update agent 113 may employ the nodes information and filter information provided in an update package during a preprocessing phase to prepare the old binary image 163 of firmware/software for updates. The update agent 113 may then employ instructions and data provided in the update package to update the old binary image 163 to a new binary image 165.

In one embodiment, the generator with nodes preprocessor 145 may employ a nodes preprocessing phase, a residue technique, and a genetic algorithm (GA) based, bank-order technique. The residue technique may be utilized to reduce the size of a generated update package. The genetic algorithm (GA) based, bank-order technique may be utilized to determine an optimum bank order.

Figure 2:
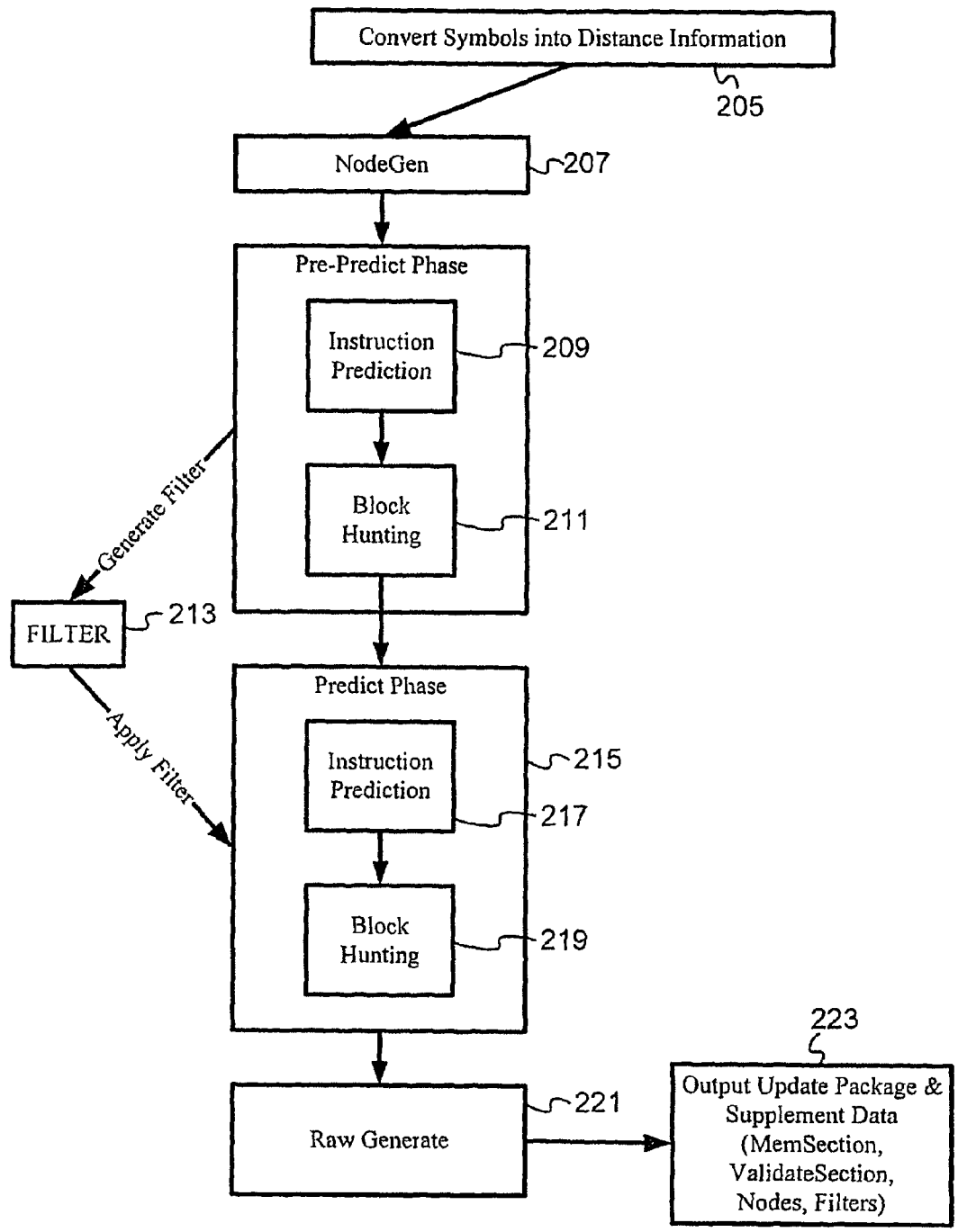
FIG. 2 illustrates a flow diagram of the operation of an exemplary generator with nodes preprocessor generating an update package using two versions of a firmware/software, in accordance with an embodiment of the present invention.

FIG. 2 illustrates a flow diagram of the operation of an exemplary generator with nodes preprocessor generating an update package using two versions of a firmware/software, in accordance with an embodiment of the present invention. The method may be used in the operation of a generator such as the generator with nodes preprocessor 145 of FIG. 1A. At the start (205), the nodes preprocessor of the generator with nodes preprocessor converts symbol information into distance information. The distance information may be collected in a file and processed during the NodeGen phase in (207).

NodeGen (207), is a technique for determining nodes, as described hereinabove, and a list of nodes based on comparing address locations of symbols in the old and new binary images of firmware/software.

Following the NodeGen (207), the pre-predict phase begins with instruction prediction (209), followed by a block hunting activity (211). The instruction prediction (209) may employ a disassembler to help identify instructions and fix address locations of pointers and other types of addresses. The instruction prediction (209) may also generate a subset of filter information that may be used to modify the old image of firmware/software to look like the new image. The block hunting activity (211), may then attempt to fix data by processing sections of binary code that could not be determined to be instructions and may appear to be data. At the end of the block hunting activity (211), filter information (213), may be generated. The instruction prediction (209), and the block hunting activity (211), both produce filter information that may be collected and processed at block 213. For example, a filter entry may convey information regarding a node location and an address range over which prediction of addresses and/or data was successful, as shown hereinafter in an example. As a result, the end of the address range specified by a filter entry may be a location where an incorrect prediction may have been encountered.

The preprocessor may perform a predict phase (215), where instruction prediction (217) may be performed followed by block hunting (219). The instruction prediction (217) may employ a subset of the filter information (213) that may have been generated by instruction prediction (209) in the pre-predict phase. Similarly, the block hunting (219) may employ a subset of the filter information (213) that may have been generated by block hunting (211) in the pre-predict phase.

Following the predict phase (215), the generator may execute a raw generation process (221) to generate an update package. The generated update package is then outputted at the end block 223. The update package may be supplemented with data that may comprise a MemSection data, ValidateSection data, nodes information and filter information.

In one embodiment, the predict phase (215) may be bypassed and the pre-predict phase followed, instead, by the processing of the filter information (213). The generation of update packages (221) may then be performed, and the update packages outputted at block 223.

Figure 3:
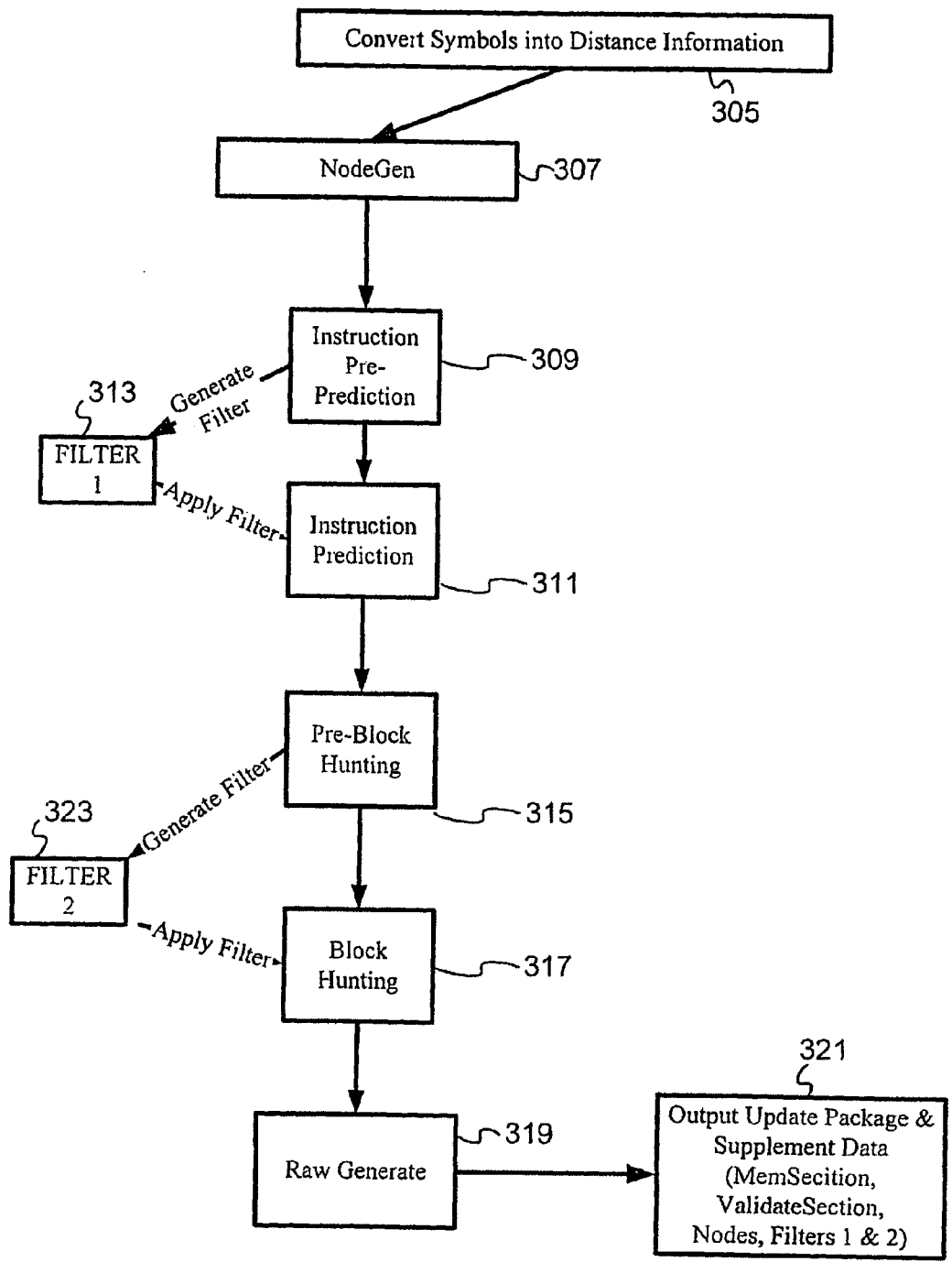
FIG. 3 illustrates a flow diagram of the operation of another exemplary generator with nodes preprocessor generating an update package using two versions of a firmware/software, in accordance with an embodiment of the present invention.

FIG. 3 illustrates a flow diagram of the operation of another exemplary generator with nodes preprocessor generating an update package using two versions of a firmware/software, in accordance with an embodiment of the present invention. At the start (305), the nodes preprocessor of the generator with nodes preprocessor may convert symbol information to distance information. The distance information may be collected into a file and processed during the next phase (307), or the NodeGen phase.

NodeGen (307), is a technique for determining nodes and a list of nodes based on comparing address locations of symbols in the old and new binary images of firmware/software, as described hereinabove.

Following the NodeGen (307), the preprocessor may conduct instruction pre-prediction (309) as part of an instruction pre-predict activity. The preprocessor may also generate and collect filter information for filter 1 (313). The instruction pre-prediction (309) may employ a disassembler to assist in identifying instructions and fixing different types of addresses, such as address locations of pointers. Following instruction pre-prediction (309), the preprocessor may conduct instruction prediction (311), where the preprocessor may apply the generated and collected filter information to the old binary image of the firmware/software, resulting in a "partially" modified old binary image.

The instruction prediction (311) may then be followed by a pre-block hunting activity (315). During the pre-block hunting activity(315), additional filter information may be generated and collected for filter 2 (323). The block hunting activity (317) may utilize the generated and collected filter information on the "partially" modified old binary image of the firmware/software, to create a modified old binary image.

Once the modified old binary image of the firmware/software is created, the generator may execute a raw generation process (319) to generate an update package. The update package is generated based on the modified old binary image and the new binary image of the firmware/software. The generated update package is then outputted (321). The update package may be supplemented with data that may comprise a MemSection data, ValidateSection data, nodes information and filters 1 (313) and filter 2 (323) information.

The update package generation by the generator with nodes preprocessor may be used for mobile handsets and other mobile electronic devices, such as devices that contain code or data in non-volatile memory which may require updates to newer or different versions.

Below is an example of distance information as discussed hereinabove, in a list format. Each row of the list contains four entries with a space between entries as a delimiter. The first entry indicates an address or location of a symbol, the second entry is the distance to the next symbol, the third entry is the code type, and the last entry is the name of the symbol associated, such as the name of a function, the name of a global variable, etc. Thus, the address 0x502C0000, for example, has a label BFLeadingSymbol, the symbol that follows it is a distance of 0x00046054 after it.

0x502C0000 0x00046054 C BFLeadingSymbol
    0x50306054 0x000000A8 C \Epoc32\Release\WD2\urel\ekern.exe_E32Startup
    0x503060FC 0x00000004 C \Epoc32\Release\WD2\urel\ekern.exe global constructors keyed to ImpAsic::Psu
    0x50306100 0x00000064 C \Epoc32\Release\WD2\urel\ekern.exe ImpDma::Init1 (void)
    0x50306164 0x00000010 C \Epoc32\Release\WD2\urel\ekern.exe ImpDma::Init3 (void)
    0x50306174 0x00000008 C \Epoc32\Release\WD2\urel\ekern.exe ImpDma::MaxBlockSize (void)
    0x5030617C 0x0000011C C\Epoc32\Release\WD2\urel\ekern.exe ImpDma::GetChannel (ImpDma::TdmaDevice)

Also, below is an exemplary list of Node Information as discussed hereinabove. Each row in the list has two entries. The first entry indicates an address location of a symbol considered to be a node, and the second entry is a distance information or offset from the previous node. Hence, the first node of this example resides at location 0x502C000, which is the same in both the old and new images. Whereas the next node, located at 0x509081B4 is offset by 48 from the corresponding node in the old image.

0x502C0000 0
    0x509081B4 48
    0x50908434 56
    0x50908660 64
    0x50908908 88
    0x50908B88 260
    0x50908EE4 276
    0x5090925C 292
    0x50909994 304

Also, below is an exemplary list of Filter Information as discussed hereinabove. Each row in the list has two entries. The first entry indicates an address location of a symbol considered to be a node, and the second entry is a distance or range information from that location over which prediction was successful. In this example the filter information indicates that a node symbol is located at the address 0x502FC0F0, and the following 0x00000058 symbols were predicted correctly by the process, however, the symbol at the location 0x00000058 later, i.e. the symbol at location 0x502FC148, did not match. The next correctly predicted symbol was at location 0x502FC174, and all the symbols in a range of 0x00003114 following that were predicted correctly, and so on.

0x502FC0F0 0x00000058
    0x502FC174 0x00003114
    0x502FF2AC 0x0000085C
    0x502FFB28 0x00003E08
    0x5030395C 0x0000165C
    0x50304FE0 0x00000074
    0x50305078 0x0004EC74
    0x50362958 0x00070980
    0x503D369C 0x0010E8F8
    0x505017CC 0x000021AC
    0x50503D9C 0x00058224
    0x5057C634 0x000924E4
    0x5060F468 0x00041E8C
    0x5066145C 0x00008344
    0x5066B74C 0x000249C8
    0x506BA754 0x000C69D0
    0x507DB028 0x00007004

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile services network comprising:
   a mobile electronic device;
   a management server;
   an update package repository;
   a generator with nodes preprocessor, which generates a package of update information; and
   wherein generating comprises scanning through symbols of an old version of firmware, locating corresponding symbols in a new version of firmware, comparing differences in addresses of the symbols, predicting differences in addresses for subsequent symbols, identifying symbols with offsets that were not predicted, and use the identified symbols as node symbols; and
   predicting location of some symbols based on relocation information gathered from the node symbols.

2. The network according to claim 1 wherein the generator with nodes preprocessor generates update packages by comparing the old version and the new version of firmware.

3. The network according to claim 2 wherein the update packages are populated into the update package repository.

4. The network according to claim 2 wherein the generated update packages incorporate filter information.

5. The network according to claim 2 wherein the generated update packages incorporate node information.

6. The network according to claim 1 wherein the management server and the update package repository are communicatively coupled.

7. The network according to claim 1 wherein the generator with nodes preprocessor and the update package repository are communicatively coupled.

8. The network according to claim 1 wherein the generator with nodes preprocessor is located at a remote location from the update package repository.

9. The network according to claim 1 wherein the mobile electronic device comprises:
   a non-volatile memory;
   a random access memory; and
   security services.

10. The network according to claim 9 wherein the non-volatile memory comprises:
    an update agent;
    a firmware and real-time operating system;
    a download agent; and
    a boot initialization.

11. The network .according to claim 10 wherein the non-volatile memory further comprises an operating system layer.

12. The network according to claim 10 wherein the non-volatile memory further comprises an end-user-related data and content unit.

13. The network according to claim 10 wherein the mobile electronic device executes an update process according to the following:
    downloading an update package from the update package repository;

rebooting;
executing the boot initialization;
determining whether an update process is needed; and
invoking the update agent.

14. The network according to claim 13 wherein the mobile electronic device determines the need for an update process based on status information.

15. The network according to claim 13 wherein the mobile electronic device invokes the update agent to execute the update process if it is determined an update process is needed.

16. A method for generating an update package stored in a computer readable medium using an old image and a new image of a firmware for a mobile electronic device in a mobile services network, the method comprising:
converting symbols in the new and old images of the firmware into distance information;
determining a list of nodes in the old and new images of the firmware;
generating filter information, wherein generating filter information comprises capturing information regarding addresses where the contents of the location in the new image of firmware was able to be predicted;
generating the update package to be stored in a computer readable medium;
outputting the generated update package;
wherein determining comprises scanning through symbols of the old image of firmware, locating corresponding symbols in the new image of firmware, comparing differences in addresses of the symbols, predicting differences in addresses for subsequent symbols, identifying symbols with offsets that were not predicted, and use the identified symbols as node symbols; and
predicting location of some symbols based on relocation information gathered from node symbols.

17. The method according to claim 16 wherein the distance information is determined by locating the symbols of the old image and the new image.

18. The method according to claim 16 wherein the determining comprises:
determining addresses of symbols in the old image;
determining addresses of corresponding symbols in the new image;
comparing the differences in the addresses of the corresponding symbols in the old image and the new image;
predicting differences in addresses of subsequent symbols based on the differences in the addresses of previous symbols;
determining the symbols for which offsets cannot be predicted; and
using the unpredictable symbols as additional node symbols.

19. The method according to claim 16 wherein a pre-predict phase is performed to generate filter information, and wherein the pre-predict phase comprises:
identifying instructions using instruction prediction;
fixing address locations and producing filter information; and
fixing data and producing filter information using block hunting.

20. The method according to claim 16 wherein the filter information comprises node location and address range information where prediction was successful.

21. The method according to claim 16 wherein a pre-predict phase is performed to generate filter information, and wherein the pre-predict phase is followed by a predict phase, wherein the predict phase comprises:
performing instruction prediction utilizing the generated filter information; and
executing block hunting utilizing the generated filter information.

22. A method for generating an update package to be stored in a computer readable medium using an old image and a new image of a firmware for a mobile electronic device in a mobile services network, the method comprising the steps of:
converting symbols in the new and old images of the firmware into distance information;
determining a list of nodes in the old and new images of the firmware;
generating information for a first filter;
creating a partially modified old image of the firmware utilizing the first filter;
generating information for a second filter;
creating a modified old image of the firmware utilizing the second filter and the partially modified old image of the firmware;
generating the update package to be stored in a computer readable medium;
outputting the generated update package; and
wherein determining comprises scanning through symbols of the old version of firmware, locating corresponding symbols in the new version of firmware, comparing differences in addresses of the symbols, predicting differences in addresses for subsequent symbols, identifying symbols with offsets that were not predicted, and use the identified symbols as node symbols; and
predicting location of some symbols based on relocation information gathered from node symbols.

* * * * *

UNITED STATES PATENT AND TRADEMARK OFFICE
CERTIFICATE OF CORRECTION

| | | |
|---|---|---|
| PATENT NO. | : 8,233,893 B2 | |
| APPLICATION NO. | : 10/646230 | |
| DATED | : July 31, 2012 | |
| INVENTOR(S) | : Shao-Chun Chen | |

It is certified that error appears in the above-identified patent and that said Letters Patent is hereby corrected as shown below:

In column 8, line 58, in Claim 11, delete ".according" and insert -- according --, therefor.

In column 9, line 34, in Claim 16, delete "from node" and insert -- from the node --, therefor.

In column 10, line 48, in Claim 22, delete "from node" and insert -- from the node --, therefor.

Signed and Sealed this
Second Day of April, 2013

Teresa Stanek Rea
*Acting Director of the United States Patent and Trademark Office*